United States Patent [19]

Noll

[11] Patent Number: 4,748,583

[45] Date of Patent: May 31, 1988

[54] CELL-STRUCTURED DIGITAL MULTIPLIER OF SEMI-SYSTOLIC CONSTRUCTION

[75] Inventor: Tobias Noll, Munich, Fed. Rep. of Germany

[73] Assignee: Siemens Aktiengesellschaft, Berlin and Munich, Fed. Rep. of Germany

[21] Appl. No.: 762,444

[22] Filed: Aug. 5, 1985

[30] Foreign Application Priority Data

Sep. 17, 1984 [DE] Fed. Rep. of Germany ....... 3434085

[51] Int. Cl.[4] .............................................. G06F 7/52
[52] U.S. Cl. ................................................... 364/758
[58] Field of Search ....................................... 364/758

[56] References Cited

U.S. PATENT DOCUMENTS

| | | | |
|---|---|---|---|
| 3,691,359 | 7/1972 | Dell et al. | 364/758 |
| 3,900,724 | 8/1975 | Melver et al. | 364/758 |
| 4,369,500 | 1/1983 | Fette | 364/758 |
| 4,432,066 | 2/1984 | Benschop | 364/758 |
| 4,441,158 | 4/1984 | Kanuma | 364/758 |

OTHER PUBLICATIONS

Effective Pipelining of Digital Systems–Jump and Ahuja Transactions on Computers, vol. C-27, No. 9, Sep. 1978.

Primary Examiner—David H. Malzahn
Attorney, Agent, or Firm—Hill, Van Santen, Steadman & Simpson

[57] ABSTRACT

A digital multiplier which has cells arranged in a plurality of rows and columns wherein the rows are assigned to different groups of partial product bits. Sum paths and carry paths are provided which connect the individual cells to each other and at their ends emit signals from which the product bits are formed. The multiplicand bits are stored intermediately together with the sum and carry signals formed in a row and are simultaneously forwarded to the next row in accordance with a pipelining process. It is desired to obtained the least possible delay in feeding a multiplier bit into all the cells of a row so as to achieve short range transit time of the signals between the output of two consecutive rows and this is achieved with a logic link element which is used to form a partial product bit which is contained in a cell which proceeds the row and in which this partial product bit is added to sum signals and carry signals. One of the cells of the following row contains a full adder which is connected to the output of the logic link with a connection line which is provided with a shift register stage. The invention can be used for integrated circuit for digital data processing.

6 Claims, 4 Drawing Sheets

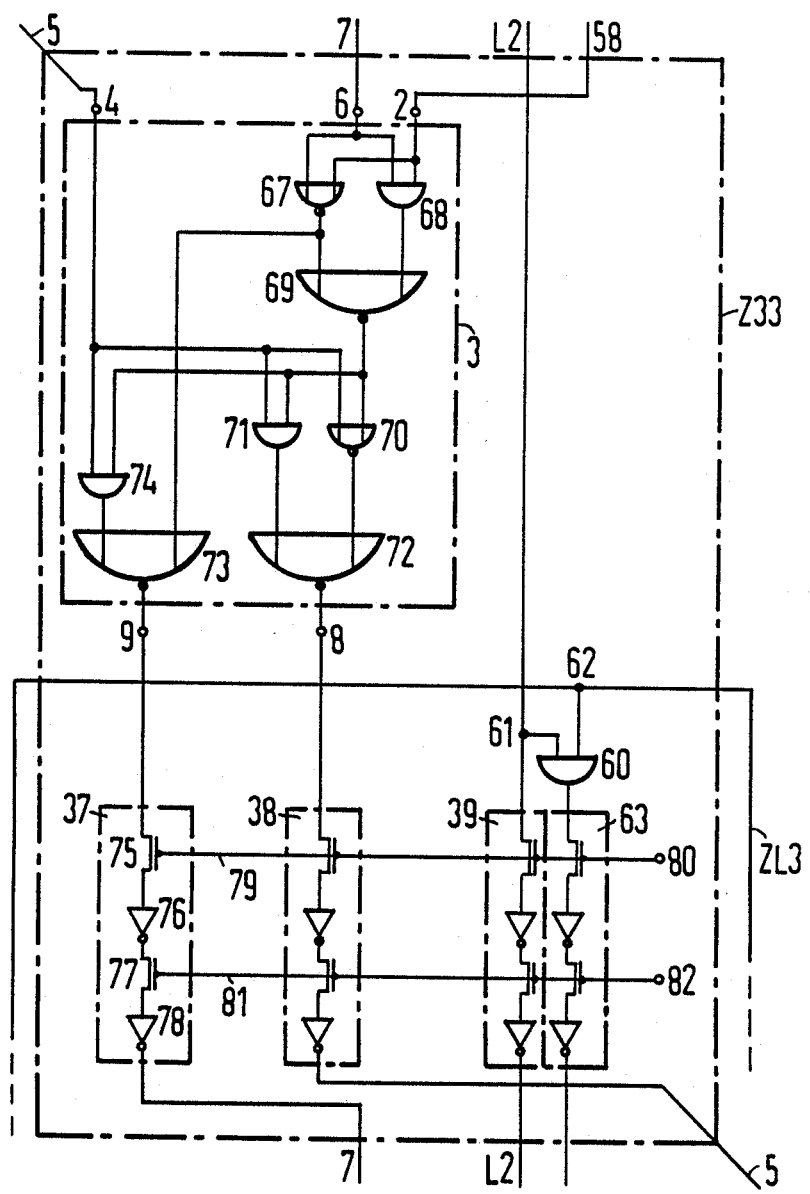

CELL-STRUCTURED DIGITAL MULTIPLIER OF SEMI-SYSTOLIC CONSTRUCTION

BACKGROUND OF THE INVENTION

1. Field of the Invention

This invention relates to a cell structure digital multiplier of semi-systolic construction.

2. Description of the Prior Art

Multipliers are described in the article by J. R. Jump and S. R. Ahuja entitled "Effective Pipelining of Digital Systems" in the magazine entitled IEEE Transactions on Computers Vol. C-27, No. 9, September 1978, pages 855–865 and in particular at FIG. 7(b). A disadvantage of the multiplier described in this article is that in particular in case of multiplicands having large word links, the two input lines which each supply a multiplier bit to all of the cells of a row must be provided with driver circuits which have transit times together with a transit times of the components of the second input lines which are located between the driver circuits and the cells under consideration substantially delay the supply of the multiplier bits. This results in a substantial increase in the stage transit time which passes between the emission of the sums and carry signals from the outputs of the shift register stages of a row and the emission of corresponding signals at the outputs of the shift register stages of the next row.

SUMMARY OF THE INVENTION

The object of the present invention is to provide a cell-structured multiplier wherein the delay of the prior art in the supply of the multiplier bits does not influence the stage transit time. This is achieved in the invention in that a logic link element which serves to form a partial product bit and a full adder in which this partial product bit is added to a sum signal and possibly to a carry signal are arranged in two separate cells which are arranged in different rows and the rows of the cell which contains the full adder is arranged following the row of the cell which contains the logic link and the output of the logic link element leads across a connection line to an input of the full adder into which the connection line there has been interposed a shift register stage which serves to intermediately store the formed partial product bits.

The advantage which can be achieved by means of the invention consists in that the delay which occurs in the supply of a multiplier bit to the cells of a row in question occurs during the stage transit time provided for the cells combined in the preceeding row. Within the stage transit time, the partial product bits for the row in question are also formed and intermediately stored. Therefore, the row in question can be supplied simultaneously both with the necessary sum signals and carry signals of the cells of the preceeding row which are intermediately stored in the register stages and also with a partial product bits which are assigned to the row in question and which are intermediately stored in other register stages of the preceeding row so that the stage transit time with the row in question is reduced to the processing time of the full adders which it contains. The same techniques are applied to the stage transit times of all of the rows so as to substantially decrease the transit times.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 6 is a circuit diagram of the cell shown in FIG. 4.

DESCRIPTION OF THE PREFERRED EMBODIMENTS

Figure 1:
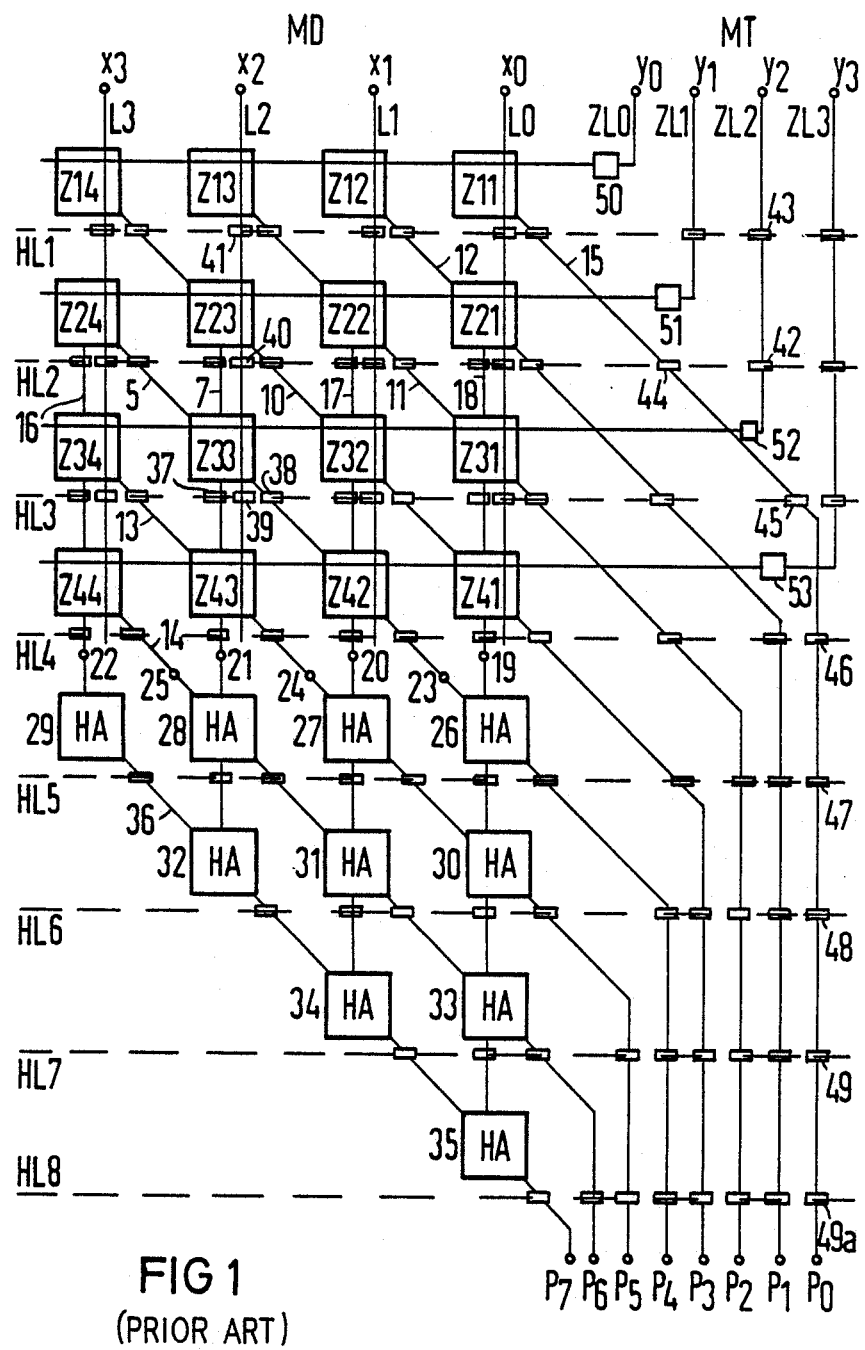
FIG. 1 is a block circuit diagram of a prior art cell-structured digital multiplier of semi-systolic construction.

The block circuit diagram illustrated in FIG. 1 corresponds to the known prior art multiplier illustrated in FIG. 7(b) of the above referenced IEEE article. In this apparatus, first input lines L0 through L3 are provided and the upper terminals are allocated to the bits $x_0$ to $x_3$ of a multiplicand MD occurring as a binary signal. $x_0$ represents the lowest value bit of MD. Second input lines ZL0 to ZL3 are connected at their input terminals to bits $y_0$ to $y_3$ of a multiplier MT which also carries binary signals and $y_0$ represents the lowest value bit. Four cells of the multiplier are combined in a first row and are indicated Z11 through Z14. In block Z11, the bit $x_0$ is logic-linked to the bit $y_0$. In cell Z12 bit $x_1$ is logic-linked to bit $y_0$. In cell Z13, bit $x_2$ is logic-linked to bit $y_0$ and in cell Z14 bit $x_3$ is logic-linked to bit $y_0$. In FIG. 1, these logic links have been indicated by the intersections of the lines L0 to L3 with the line ZL0. The logic-links which either have the logic value 0 or 1 are referred to as a first group of partial product bits.

A second row contains four additional cells Z21 to Z24 in which AND logic-links $x_0$ to $y_1$, $x_1$ to $y_1$, $x_2$ to $y_1$ and $x_3$ to $y_1$ occur which has been indicated by the intersection of the lines L0 to L3 and ZL1. The latter logic-link results represent a second group of partial product bits. In the same manner, two further groups of partial product bits are formed in two additional rows which contain the cells Z31 to Z34 and Z41 to Z44 respectively.

Figure 2:
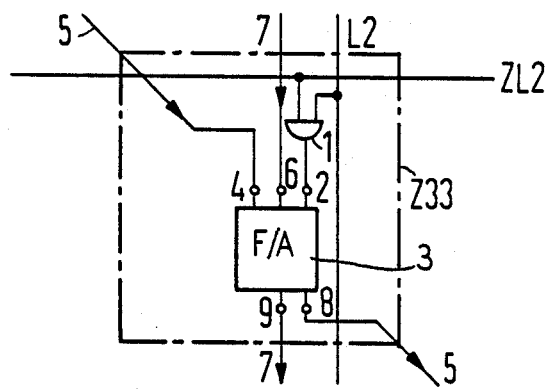
FIG. 2 is a block circuit diagram of one cell of the multiplier illustrated in FIG. 1.

FIG. 2 illustrates the construction of one of these cells which are generally of identical construction and FIG. 2 illustrates the cell Z33, for example. The lines L2 and ZL2 which have an intersection point in the region of Z33 are connected to the inputs of an AND gate 1 which has an output connected to the input 2 of a full adder 3. A second input 4 of the full adder 3 is connected to that part of a sum path 5 which will be described further hereafter by way of which a sum signal is received. In addition, a third input 6 of the full adder 3 is connected to that part of a carry path 7 which will be later described by way of which a carry signal is received. The sum output 8 of the full adder 3 is connected to a second part of the sum path 5 by way of which a sum signal is emitted. The carry output 9 of full adder 3 is connected to a second part of the carry path 7 by way of which a carry signal is emitted.

As illustrated in FIG. 1, the sum path 5 runs across the cells Z24, Z33 and Z42. Additional sum paths are indicated by 10 to 14 and respectively run across the cells Z14, Z23, Z32, Z41 and Z13, Z22, Z31 and Z12 Z21 and Z34, Z43 and Z44, respectively. A path 15 can also be considered to represent a sum path that runs only across the cell Z11. The cells Z11 to Z14 can be of a simpler design than the other cells since they need not contain full adders. In the case of these particular cells the output of the AND gate 1 can in each case be connected to a part of a sum path which is connected at the right hand lower point and by way of which a signal is emitted. Each of the indicated subcomponents of the signal paths 5 and 10 to 13 indicate that the signal which occurs at the right hand lower corner of a cell is fed to the left hand upper corner point of the next cell located on the sum path under consideration and, thus, to the input for of its associated full adder 3.

As indicated in FIG. 1, the carry paths 7 runs across the cells Z23, Z33 and Z43. Additional carry paths are indicated by 16 through 18 and run across the cells Z24, Z34, Z44 and Z22, Z32, Z42 and Z21, Z31, Z41, respectively. Each of the represented subcomponents of these carry paths indicates that a carry signal which is emitted at the lower boundary of a cell and which is derived from the carry output 9 of this particular cell is fed to the upper boundary of the next cell located on the path and from there to the input 6 of the associated full adder 3.

The lower value product bits $P_0$ to $P_3$ can be directly obtained from the lower ends of the sum paths 15, 12, 11, and 10. The higher value product bits are formed of signals which occur at the end terminals 19 to 22 of the carry paths 18, 17, 7 and 16 and at the end terminals 23 to 25 of the sum paths 5, 13 and 14. For this purpose, addition stages 26 to 35 are provided of which the stages 26 to 29 are each connected to the cells Z41 to Z44 by way of the extended carry paths 18, 17, 7 and 16. The extended carry path 7 also connects the stages 28 and 32 to each other and the extended carry path 17 connects the stages 27, 31 and 34 and the extended carry path 18 connects the stages 26, 30, 33 and 35. Also, the extended sum path 5 runs across the stage 26 and the extended sum path 13 runs across the stages 27 and 30. The extended sum path 14 runs across the stages 28, 31 and 33 and a further sum path 36 runs across the stages 29, 32, 34 and 35. Each subcomponent of an extended carry path indicates that a carry signal is tapped at the lower boundary of an addition stage and, thus, at the carry output of the adder which it contains and is fed to the upper boundary of the next addition stage located on the carry path and from here to the first input of the adder which it contains. Also, each subcomponent of one of the extended sum paths indicates that a sum signal occurring at the sum output of the adder which it contains is tapped from the right hand lower corner of a stage and is fed to the next addition stage located on the sum path by way of the left hand upper corner of its boundary to an input of the addressor which it contains. Since the stages 26 to 35 are only supplied with a maximum of two input signals, their adders can be designed as half adders which is indicated by the reference HA. Then the product bits P4 to P7 can be obtained from the lower ends of the sum paths 5, 13, 14 and 36.

In FIG. 1 in the sum and carry outputs 8 and 9 illustrated in FIG. 2 of the individual cells as, for example, cell Z33 there are provided shift register stages 37 and 38 in which the emitted sum and carry signals are intermediately stored. In addition, further shift register stages 39 are interposed into the input lines L0 to L3 in a manner such that prior to each branching, in other words, 39a of such a line which occurs in the region of a cell as, for example, cell Z33, a number of register stages are interposed which correspond to the number of preceeding rows. Since the cell Z33 and the branching 39a occur in the third row there are thus two proceeding rows. Thus, two further shift register stages 40 and 41 are arranged in that part of L2 which lies above the branch 39a for cell Z33. Similarly, a number of shift register stages such as 42 and 43 corresponding to the number of preceeding rows are interposed into the second input lines ZL2 each of which is assigned to a specific row of cells Z31 to Z34. Since the input line ZL2 is assigned to those cells Z31 to Z34 contained in the third row it contains two shift register stages 42 and 43. The shift register stages 37 and 38 at the output of the individual cells as, for example, cell Z33 and also the further shift register stages 39 on the first input lines are included in the individual cells as, for example, cell Z33 although for purposes of clarity they have been shown outside of the cells in FIG. 1.

FIG. 1 indicates in horizontal broken lines HL1 to HL4 each of which indicate the position of the shift register stages at the output of the cells in the individual rows. The shift register stages are clock controlled in a manner such that all of the signals which occur at the output of the cells as, for example, cell Z11 to Z14 of a row and which are intermediately stored in the shift register stages indicated by HL1 are transferred within a clock period to the next row of cells Z21 to Z24 and the signals occurring at the output of this row are then transferred within the next clock period to the following row or the cells Z31 to Z34 and so forth. Since the addition stages 26 to 25 are also included in the clock diagram by means of corresponding shift register stages indicated by the lines HL5 to HL8, the product bits $P_0$ to $P_7$ are not available until after the signal transfer by the line HL8. Because of the further shift register stages such as 42 and 43 in the second input lines ZL0 to ZL3 and because of the clock controlled forwarding of the product bits, $P_0$ by means of the shift registers stages 44 to 49a which are interposed into the sum paths 15 depending upon the clock period in question, all the signals required for the product formation of MD and MT only occur between two consecutive horizontal lines, HL3 and HL4 so that in the vertical direction of FIG. 1 only mutually adjacent parts of the circuit influence each other. This characteristic corresponds to a so-called systolic circuit construction in the vertical direction. However, as in the vertical direction the bits $y_2$ of MT are supplied to all the cells of a row such as cells Z31 to Z34 within a clock period, the construction is referred to as semi-systolic.

Because of the semi-systolic construction, the above-referred to problem occurs that in the case of a long word, the supply of a multiplier bit by means of driver circuits 50 to 53 interposed into lines ZL0 to ZL3 and the horizontal components of these lines causes the clock period to be selected which must be correspondingly long. However, this means a correspondingly long stage transit of the signals between two consecutive lines such as HL2 and HL3. Within a clock period, the described clock control permits only one circuit stage, in other words, the circuit components are located between adjacent horizontal lines HL2 and HL3 to be assigned to a specific multiplication of MD with MT. The other stages can be used simultaneously for further multiplication operations so that the throughput rate of the circuit which is the competition rate is multiplied accordingly. This principle is referred to as "pipelining" in the technical literature.

Figure 3:
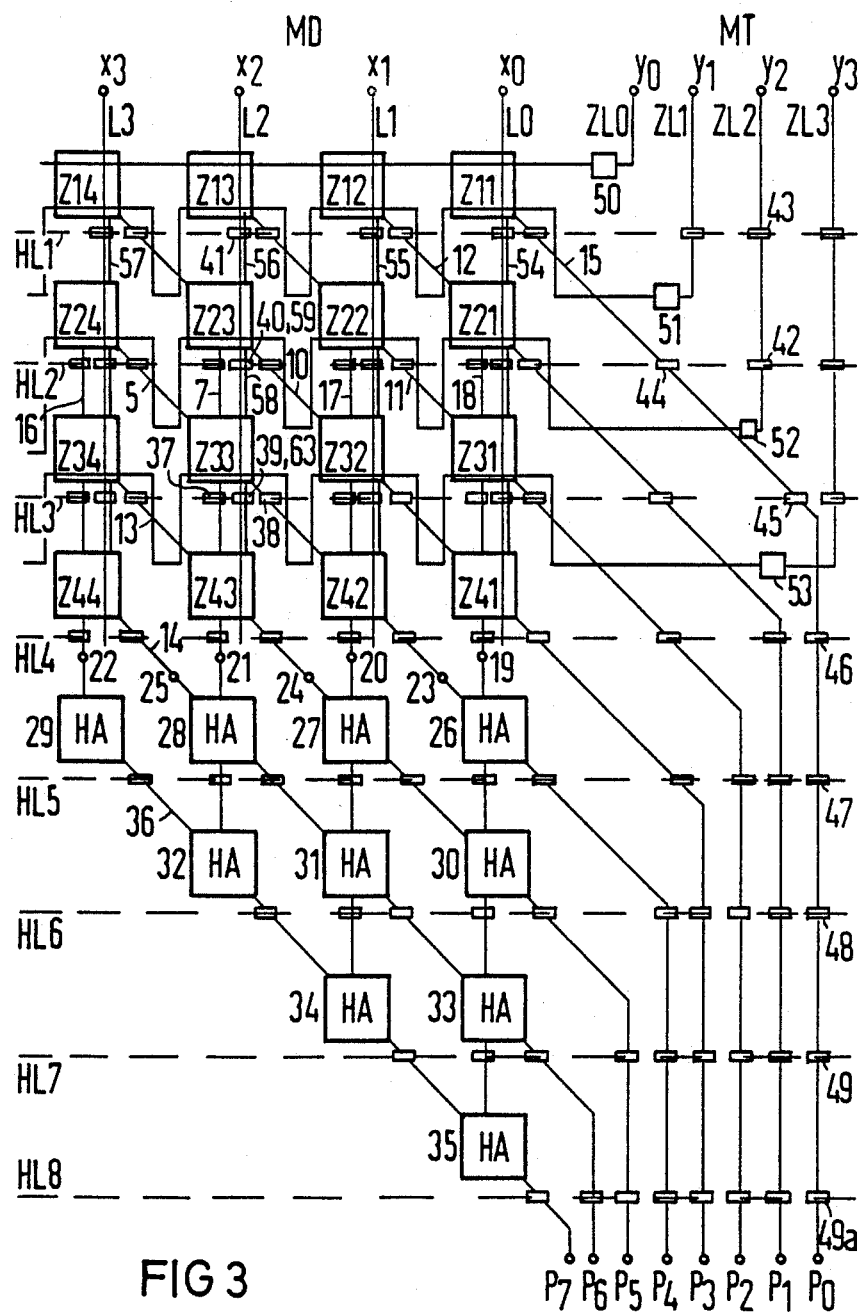
FIG. 3 is the block diagram of a multiplier according to the invention.

FIG. 3 is a circuit block diagram of the multiplier of the invention and it differs from the circuit of FIG. 1 in that the second input line ZL1 by way of which the bit $y_1$ of the multiplier MT is supplied runs not across the cells Z21 to Z24 but across the cells Z11 to Z14. Although the partial product bits which are formed as a result of the AND logic link between $x_0$ and $y_1$, $x_1$ and $y_1$, $x_2$ and $y_1$ and $x_3$ and $y_1$ are assigned to the cells Z21 to Z24 in which they are added to the sum signals supplied by way of the sum paths 12, 11 and 10 from the cells Z12, Z13 and Z14, the intersection points of the lines LO to L3 with ZL1 are each located in the region of the cells Z11 to Z14. Consequently, the partial product bits which are assigned to the cells Z21 to Z24 are formed in the cells Z11 to Z14. The partial product bits which are formed are then fed by way of connection lines 54 to 57 to inputs of the full adders contained in the cells Z21 to Z24. Second inputs of these adders are filled according to FIG. 1 with the sum signals which are obtained by way of the sum paths, 12, 11 and 10. Thus, in the case of a multiplier shown in FIG. 3 the formation of the partial product bits which occur in accordance with FIG. 1 in the cells Z21 to Z24 is accomplished in the cells Z11 to Z14 and thus in the preceding row.

In a similar manner the formation of the partial product bits which in FIG. 1 occurs in the third and fourth rows occurs in the invention according to FIG. 3 in the second and third rows and this is indicated by the curves in the lines ZL2 and ZL3 which have intersection points with the lines LO to L3 located in the cells of the second and third rows.

Generally, in FIG. 3 the partial product bit which is to be added in a specific cell as for example cell Z33 to the sum and carry signals supplied to this cell by way of a sum path 5 and a carry path 7 is formed in the corresponding cell Z23 of the preceding row by an AND logic link where the logic link results is fed by way of a connection line 58 to the cell under consideration. In this manner, the delay which occurs during the supply of a multiplier bit such as $y_2$ and in the formation of the partial product bit and which results primarily from the transit times of a driver circuit 52 and the horizontal path of the input line ZL2 under consideration can be displaced into the stage transit time of the subcircuit between the lines HL1 and HL2. A shift register stage 59 which can be assigned to the cell of the proceeding row such a cell Z23 is interposed into the connection line 58. In FIG. 3 for reasons of clarity, this shift register stage has been indicated outside of Z23. The essential consideration is that the shift register stage 59 is clock controlled simultaneously with the other shift register stages which are connected to the output of the cells Z21 to Z24 as indicated by the line HL2.

As illustrated in FIG. 3 the cells Z11 to Z34 in other words all of the cells of the first three rows have outputs for connection lines which lead to inputs of the full adders of the corresponding cells of the next row. At all of these outputs, there are arranged shift register stages 59 which assure that the cells Z21 to Z44 are supplied with their assigned partial product bits together with the sum and carry signals of the preceding row. This results in a reduction of the stage transit times of the second row formed from the cells Z21 to Z24 and of the third row formed from the cells Z31 to Z34 and of the fourth row formed from the cells Z41 to Z44 and to the processing time of the full adders which they contain. Since the delays mentioned in the supply of the multiplier bits are included in the stage transit times of the preceding rows they are no longer significance since they do not exceed a full adder transit time. However, this could only occur in the case of such wide word widths of the multiplicand MD that such situation is virtually without significance.

The other parts of FIG. 3 have been described with respect to FIG. 1 and have been indicated by the same reference numerals as those elements in FIG. 1 and will not be described again.

Figure 4:
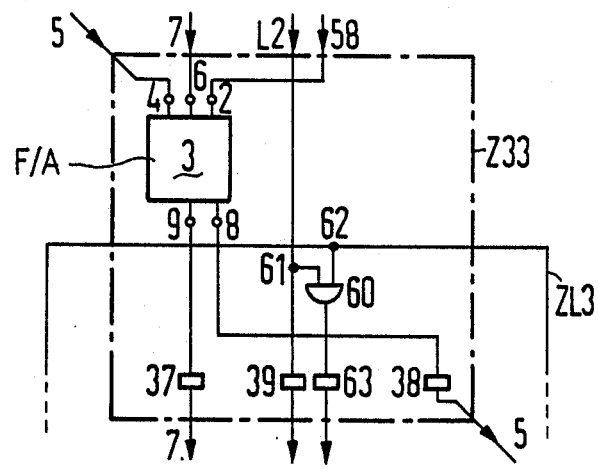
FIG. 4 is a block circuit diagram of one cell of the multiplier illustrated in FIG. 3.

FIG. 4 illustrates a cell Z33 designed according to the invention of the multiplier shown in FIG. 3. A full adder 3 is provided with inputs 2, 4 and 6, a sum output 8 and a carry output 9. The input 2 is connected to the connection line. The input 4 is connected to the sum path 5 and the input 6 is connected to the carry path 7. The sum output 8 is connected to the next subcomponent of the sum path 5 and the carry path 9 is connected to the next subcomponent of the carry path 7. The first input of an AND gate 60 is connected to the circuit point 61 to the input line L2 and the other input is connected to the circuit point 62 to the input ZL3. In FIG. 3 the shift register stages 37, 38 and 39 are included in the cell C33. In the same manner, a shift register stage 63 which is located on the connection which is connected to the output of AND gate 60 and which leads to the input 2 of cell Z43 has been shown as part of the cell Z33.

Figure 5:
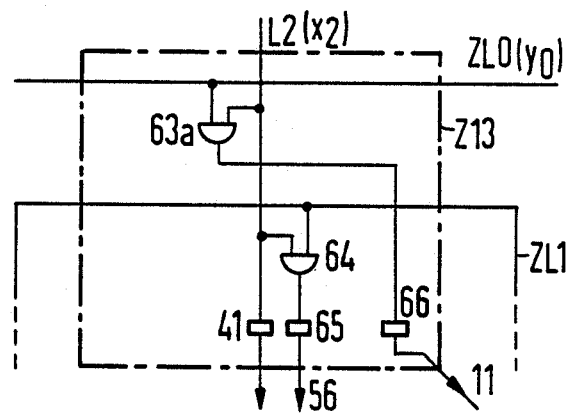
FIG. 5 illustrates a simplified cell of the multiplier illustrated in FIG. 3.

FIG. 5 is the block circuit diagram of one of the cells Z11 to Z14 illustrated in FIG. 3 which are of identical construction to each other and the cell Z13 is illustrated. In an AND gate 63a, partial product bit corresponding either to a logic 1 or to a logic 0 is formed from the bits $x_2$ and $y_0$. This partial product bit is emitted by way of the sum path 11 to the cell C22. Since no sum or carry signals are supplied, a full adder is not required. For the formation of the partial product bit required in cell Z23 an AND gate 64 is provided whose inputs are each connected to the line ZL2 and ZL1. The output of AND gate 64 is connected to the connection line 56 which leads to an input of the full adder of cell Z23. In addition to shift register stage 41 further shift register stages 65 and 66 are interposed in the connection lines 56 and the sum path 11.

FIG. 6 is a circuit diagram of cell Z33 which is schematically illustrated in FIG. 4. The full adder 3 contains an OR gate 67 whose two inputs are connected to the inputs 2 and 6 of the full adder 3. The two inputs of AND gate 68 are connected to the inputs 2 and 6. The output of gates 67 and 68 are supplied as inputs to an OR gate 69. The output of gate 69 is connected to the first input of an OR gate 70 which receives a second input comprising input 4 of the full adder 3. An AND gate 71 has two inputs which are connected to the output of gate 69 and to the input 4 of the full adder 3. The outpts of gates 70 and 71 are connected to the inputs of an OR gate 72 whose output forms the sum output 8 of the full adder 3. The output of the NOR gate 67 also leads to the first input of a NOR gate 73. The output of an AND gate 74 which has inputs connected to the output of gate 69 and to input 4 of the full adder 3 is connected to the second input of gate 73. The output of gate 73 represents the inverted carry output 9 of the full adder 3.

The shift register stage 37 consists of a series arrangement of a field effect transistor 75 connected to an inverter 76 which has its output connected to a second field effect transistor 77 which has its output connected to a second inverter 78 and its output is connected to that part of the carry path 7 which forms the carry signals. The gate of the transistor 75 is driven by way of a line 79 which has a terminal 80 which receives a clock voltage $\phi_M$. Also the gate of field effect transistor 77 is driven by line 81 which has a terminal 82 that receives a clock voltage $\phi_S$. When a clock pulse $\phi_M$ occurs, a carry signal occurring at the output 9 is transmitted to the input of the inverter 76. When a clock pulse $\phi_S$ which cannot be allowed to coincide with the clock pulse $\phi_M$ occurs, the carry signal is emitted by the transistor 77 and the inverter 78 to the carry path 7 and the transistors 75 is in the blocking condition during this time. The shift register stages 38, 39 and 63 are each constructed according to shift register stage 37 and their transistors are driven in common with the transistors 75 and 77 by lines 79 and 81.

The cells of the second to fourth rows are advantageously designed as shown in FIG. 6. Here the inputs 4 of the cells Z24, Z34 and Z44 contain a logic 0.

The previously described multiplier for four digit multiplicands and multiplier represents only an exemplary embodiment of explaining the invention. It is to be realized that the principle of the invention can be extended to cell structure multipliers established for binary numbers having any arbitrary number of digits.

In contrast to the described exemplary embodiment of the invention, it can also be expedient to use a NAND gate in place of the AND gate 60 in all of the cells. For this case, the inverted partial product bits are forwarded to the cells to which they are assigned. Advantageously, the carry signals formed in the full adders are then emitted in inverted form at the outputs 9 and the inversion of the received partial product bits and carry signals of the full adders 3 is accordingly taken into account.

Also, in contrast to the exemplary embodiment illustrated in FIG. 3, individual or several of the horizontal lines HL1 to HL8 and the shift register stages which they indicate can be eliminated. This is possible when a clock period corresponds to a multiple of the processing time of a full adder 3.

Although the invention has been described with respect to preferred embodiments, it is not to be so limited as changes and modifications can be made which are within the full intended scope of the invention as defined by the appended claims.

I claim as my invention:

1. A cell-structured, digital multiplier of semi-systolic construction, wherein all the bits of the multiplicand are respectively AND-logic-linked to one bit of a multiplier to form a group of partial product bits, and one such group is formed for each multiplier bit, comprising a first plurality of cells arranged in a first row which generates a first group of partial product bits and said first plurality of cells receiving all of the multiplicand bits to AND-logic-link them to the lowest value multiplier bit, further plurality of cells contained in further rows following said first row and assigned to further groups of partial product bits, and the cells of each further row generate the partial product bits formed by an AND-logic-link of all the multiplicand bits to one single multiplier bit, and the value of the multiplier bit which is used increases from row to row, a first plurality of input lines to which the multiplicand bits are supplied and said first plurality of input lines connected to selected ones of said cells, a second plurality of input lines to which the multiplier bits are supplied and said second plurality of input lines connected to selected ones of said cells which are contained in a row, a plurality of sum paths which extend through those cells which are assigned to the partial product bits of equal values which are to be added to each other, a plurality of carry paths which extend through those cells which are assigned to partial product bits of rising value which are to be added to each other, a plurality of full adders contained in each of said first plurality and said further plurality of cells, and said full adders adding a sum signal supplied by one of said plurality of sum paths and a carry signal supplied by one of said plurality of carry paths and the partial product bit assigned to said cell, all of said first and further plurality of cells each contain a first logic-link element which performs an AND-logic-link of a multiplicand bit to a multiplier bit, all of said first and said further plurality of cells contain shift register stages which are connected to the sum output and the carry output of each cell, further shift register stages connected to first and second input lines such that all the input lines which are connected to the cells of one row each contain a number of further shift register stages which corresponds to the number of preceding rows, digital signals obtained from the ends of said sum paths and said carry paths combined to form product bits, a first logic-link element in said cells so as to form a partial product bit, a plurality of full-adders in which the partial product bit is added to a sum signal and possibly to a carry signal are each located in two separate cells (Z23, Z33) which are located in different rows, the row of the cell (Z33) which contains the full-adder is located following the row of the cell (Z23) which contains said first logic-link element, and the output of said first logic-link element extends across a connection line (58) to an input of said full-adder which has a shift register stage (59) connected to its connection which serves to intermediately store the formed partial product bits.

2. A cell-structured, digital multiplier according to claim 1, wherein cell (Z23) which contains said first logic-link element and the cell (Z33) which contains the full-adder are each connected in series to the same carry path (7).

3. A cell-structured, digital multiplier according to claims 1 or 2, wherein in addition to a first logic-link element (64) for the formation of the partial product bits assigned to the cells (Z21 to Z24) of the second row, the cells (Z11 to Z14) arranged in the first row each contain a second logic-link element (63a) for the formation of the partial product bits to which they are assigned, and the outputs of the second logic-link elements (63a) are connected to said sum paths (15, 12, 11, 10).

4. A cell-structured, digital multiplier as claimed in claim 3, wherein said shift register stages (66) are arranged at each of the outputs of the second logic-link elements (63a) of the cells (Z21 to Z14) which are arranged in the first row.

5. A cell-structured, digital multiplier according to claim, 1 wherein a plurality of driver circuits are connected at the output end of the further shift register stages (42, 43) and are mounted in the second input lines (ZL0 to ZL3).

6. A cell-structured, digital multiplier according to claim 1 wherein said shift register stages (37, 38, 39, 63)

each consist of a series arrangement of a first field effect transistor (75), a first inverter (76), a second field effect transistor (77), and a second inverter (78), with the gates of said first and second field effect transistors (75, 77) of said shift register stages (37, 38, 39, 63) which are arranged at the outputs of the cells of a row driven by a common line (79, 81).

* * * * *